United States Patent Office 3,318,811
Patented May 9, 1967

3,318,811
LUBRICATING OIL CONTAINING A DIACID DIPHOSPHATE ESTER
Joseph John Conradi, St. Louis, and Margaret A. Kelly, Jennings, Mo., assignors to Shell Oil Company, New York, N.Y., a corporation of Delaware
No Drawing. Filed Dec. 30, 1965, Ser. No. 518,967
6 Claims. (Cl. 252—49.9)

The present invention relates to improved functional organic compositions and additives therefore. More particularly, the present invention relates to industrial fluids such as fuels and lubricants having imparted to them beneficial properties by addition thereto of a small amount of a new and novel diacid diphosphate ester and amine complexes thereof.

In general, functional fluids are doped with various compounds such as antioxidants, detergents, corrosion inhibitors, extreme pressure agents and the like. The convention oil additives impart some beneficial properties to base stocks but under severe engine operating conditions they generally fail to impart their expected beneficial properties. This is particularly true with oils containing non-ash forming nitrogen-containing polymeric detergents such as copolymers of C-vinyl pyridine of N-vinyl pyrrolidone and $C_{8-30}$ alkyl methacrylates and succinimides of $C_{30-500}$ olefin-substituted succinic anhydride and polyalkylene polyamines, e.g., triethylene tetramine or tetraethylene pentamine and mixtures thereof.

The new and novel class of compounds which are particularly useful in amounts of from 0.1% to 15% in neat or compounded oils, fuels or greases, and preferably in lubricating oil containing non-ash forming polymeric detergents of the classes mentioned above are diacid diphosphate esters having the general formula:

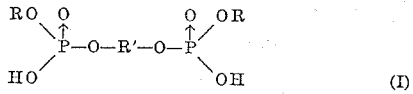

where R is a hydrocarbyl radical such as $C_{1-30}$ straight-chain or branch-chain alkyl radical, or alkaryl, or aralkyl or cycloalkyl radicals having from 4 to 20 carbon atoms and R' is hydrocarbyl group, e.g., an aliphatic, aromatic or cyclic group having from 2 to 30 and preferably 6 to 22 carbon atoms.

The diacid diphosphate esters are prepared by first reacting a suitable organic diol which may be an aliphatic, aromatic or cycloaliphatic diol with phosphorus oxychloride, preferably in the presence of a suitable catalyst such as a nitrogen base compound, e.g., alkylamine or a metal chloride which can be a mono- or poly-valent metal chloride such as an alkali metal chloride or aluminum chloride to form the intermediate organo bis(phosphorodichloridate) and treating the intermediate product with a suitable monohydric alcohol or an alkali metal alcoholate to form the diacid diphosphate directly when two equivalents of an alcoholate are used or if four equivalents are used the full ester is formed, from which on hydrolysis the desired half esterified bisphosphate is produced.

In the formation of the intermediate product the organic diol is reacted with the phosphorus oxychloride in the mole ratio of from 1 to 4 moles (1–2 moles) of the phosphorus oxychloride per mole or organic diol, under reflux conditions generally between 50 and 200° C. and preferably in the presence of an alkali chloride, e.g., Na or K chloride. The intermediate product is then reacted with a suitable amount of monohydric alcohol or alcoholate in an inert hydrocarbon solvent under esterifying reflux conditions to form the diacid diphosphate ester directly or on hydrolysis, if necessary. The alcohols or alcoholates can be aliphatic, aromatic or alicyclic alcohols or alcoholates.

The organic diols used in forming the organo bis(phosphorodichloridate) can be represented by $R''—(OH)_2$ where R'' is an organic hydrocarbyl radical of from 1 to 30 carbon atoms and the position of the hydroxy groups should be such as that both hydroxy groups readily react with the phosphorus oxychloride to form the bis(phosphorodichloridate). Preferred classes of organo-diols are: (1) alkanediols where the hydroxy groups are preferably on the alpha and omega carbons of the alkane portion of the molecule which contains from 1 to 30 carbon atoms; (2) cycloalkanediols and (3) aromatic diols. The diols of group (1) can be represented by the formula $HO—(R''')_n—OH$ where R''' is an aliphatic hydrocarbon radical having from 1 to 30 and preferably from 6 to 22 carbon atoms and includes such compounds as: ethane-alpha,omega-diol, propane-alpha,omega-diol, butane-alpha,omega-diol, pentane-alpha,omega-diol, hexane-alpha,omega-diol, octane-alpha,omega-diol, decane-alpha,omega-diol, dodecane-alpha,omega-diol, tetradecane-alpha,omega-diol, hexadecane-alpha,omega-diol, octadecane-alpha,omega-diol, propylene glycol, hexylene glycol, 2-ethyl-1,3-hexanediol, 2-methyl-2-ethyl-1,3-propanediol, 2,2'-dimethyl-1,3'-butanediol, and the like. The cycloalkanediols of group (2) include cyclopentanediol, cyclohexanediol, 1,4-dimethylol cyclohexane and the like, while the aromatic diols of group (3) include dihydroxy benzenes or dihydroxy naphthalenes such as resorcinol or hydroquinone or alkyl-substituted derivatives thereof or bisphenols such as bis(2,6-ditert.butyl-4-hydroxyphenyl)methane and the like.

The alcohols or alcoholates used to form the partial diphosphate esters of the present invention can be aliphatic, cycloaliphatic and/or aromatic alcohols or alcoholates having from 1 to 30 and preferably 4 to 20 carbon atoms. The following examples illustrate these alcohols: aliphatic alcohols of from 4 to 20 carbon atoms, such as butanol, pentanol, octanol, decanol, tetradecanol; aromatic alcohols include phenol, $C_{2-18}$ alkyl phenol, e.g., nonyl phenol; and cycloalkanol includes cyclohexanol, dialkyl-substituted cyclohexanol and the like.

EXAMPLE I 1,4-phenylene bis(phosphorodichloridate) (intermediate)

55 g. (0.5 mole) of hydroquinone and 153 g. (1.5 mole) of phosphorus oxychloride were mixed and heated to the boiling point for 3 hours after addition of 5 g. of potassium chloride. The mixture became clear after a short time. The excess of $POCl_3$ was removed in vacuo and the residue recrystallized from benzene, M.P. 123–124° C.
Analysis.—Calcd. for $C_6H_4Cl_4O_4P_2$ [344]: Cl, 41.3; P, 18.0. Found: Cl, 40.1; P, 17.5.

Sodium n-dodecyclalcoholate

A mixture of 55.8 g. (0.3 moles) of n-dodecanol and 6.9 g. (0.3 moles) of sodium was heated in 150 ml. of benzene to its boiling point. After standing overnight 200 ml. of benzene were added and the heating continued until completion of the reaction. The mixture was used without any purification.

1,4-phenylene-bis(n-dodecyl hydrogen phosphate) (final product)

62.4 g. (0.3 mole) of n-dodecylalcoholate in 350 ml. of benzene were slowly added to a solution of 51.6 g. (0.15 mole) of 1,4-phenylene-bis(phosphorodichloridate) in 200 ml. of boiling benzene. The addition was finished after 3 hours. The mixture was kept boiling for 2 additional hours. 250 ml. of water were added to the solution after standing for 2 weeks. The water was removed the next day, the benzene phase was dried over MgSO$_4$ and the solvent evaporated in vacuo. An almost colorless substance was obtained, M.P. 88–91° C., insoluble in petroleum ether, dichloromethane, soluble in tetrahydrofuran and ethanol. Recrystallization from ethanol gave a colorless product, M.P. 100–101° C.

*Analysis.*—Calcd. for C$_{30}$H$_{56}$O$_8$P$_2$ [606]: C, 59,4; H, 9.25; P, 10.2. Found: C. 58.7; H, 9.43; P, 9.1

Acid number (Tan-E).—Calcd. 185, found 195 [mg. KOH/g. sample].

EXAMPLE II

*1,4-dimethylene cyclohexane-bis(phosphorodichloridate) (intermediate)*

144 g. (1.0 mole) of 1,4-dimethylol cylcohexane in 200 ml. of benzene were slowly added to 306 g. (2.0 mole) of phosphorus oxychloride. The mixture was stirred and the reaction vessel was cooled during the addition. A stream of dry nitrogen bubbled through the solution to remove HCl. The addition was finished after 5 hours. The benzene was removed in vacuo after standing overnight. A dark red colored syrup was obtained which was not distilled in order to avoid thermal decomposition. The yield of the crude product was almost quantitative.

*Sodium n-octadecylalcoholate*

135 g. (0.5 mole) of octadecanol-1 and 11.5 g. (0.5 mole) of sodium were heated together. When the reaction mixture became solid 300 ml. of benzene were added. The reaction was completely finished after about one week. The mixture was used without further purification.

*1,4-dimethylene cyclohexane-bis(n-octadecyl hydrogen phosphate) (final product)*

94.5 g. (0.25 mole) of 1,4-dimethylene cyclohexane-bis(phosphorodichloridate) were added to 146 g. (0.5 mole) of sodium-n-octadecylalcoholate with stirring. The phosphorus compound had been dissolved in 100 ml. of benzene. The mixture was heated after the addition (2 hours) for an additional 4 hours with stirring. Water was added to the mixture after standing overnight and an emulsion was formed. The emulsion was extracted with 350 ml. of petroleum ether, which could be separated. The water-benzene emulsion was evaporated in vacuo and the remaining residue was recrystallized from ethanol, M.P. 74–76° C.

*Analysis.*—Calcd. for C$_{44}$H$_{84}$O$_8$P$_2$ [808]: C, 65.3; H. 11.15; P, 7.7. Found: C, 65.1; H. 11.2; P, 5.7.

EXAMPLE III

*Decane-1,10-bis(phosphorodichloridate) (intermediate)*

174 g. (1.0 mole) of 1,10-decanediol were added to 459 g. (3.0 mole) of phosphorus oxychloride with stirring and cooling. The mixture became warm. After standing overnight nitrogen was bubbled through the solution at room temperature. The excess of POCl$_3$ was then removed in vacuo up to 130° C., but while the mixture cooled down a violent decomposition occurred suddenly.

The reaction was repeated with 230 g. (1.5 mole) of phosphorus oxychloride in 250 ml. of benzene and 87 g. (0.5 mole) of 1,10-decanediol. The mixture was stirred after the addition for two more hours. Phosphorus oxychloride was removed in vacuo only slightly above room temperature until constancy of weight. The yield of the crude product was quantitative.

*Decane-1,10-bis(n-dodecyl hydrogen phosphate) (final product)*

A mixture of 37.2 g. of (0.2 mole) of n-dodecanol and 20.2 g. (0.2 mole) of triethylamine in 100 ml. of benzene was added dropwise to 45.8 g. (0.11 mole) of decane-1,4-bis(phosphorodichloridate) in 200 ml. of benzene with stirring. The mixture was allowed to stand for 20 hours. Then 27.4 g. (100% of theory) of triethylamine hydrochloride were filtered off and the residue was twice treated with water. The separated benzene phase was dried over MgSO$_4$ and the solvent was removed in vacuo. The syrupy oil was dissolved in ether and twice washed with water again. A thick precipitate was formed at the end of 48 hours, the solvent was removed in vacuo and the substance recrystallized from ethanol, M.P. 79–83° C.

*Analysis.*—Calcd. for C$_{34}$H$_{72}$O$_8$P$_2$ [670]: C, 60.8; H, 10.8; P, 9.25. Found: C, 57.6; H, 10.4; P, 9.14.

EXAMPLE IV

*Decane-1,10-bis(n-octadecyl hydrogen phosphate)*

A mixture of 541 g. (2.0 mole) of n-octadecanol-1 and 202 g. (2.0 moles) of triethylamine, both dissolved in 600 ml. of benzene, was added to 405 g. (1.0 mole) of crude decane-1,4-bis(phosphorodichloridate). The mixture became warm and a precipitation occurred. The precipitate was filtered off after standing over the weekend. The benzene phase was treated with 500 ml. of water, the precipitating materal was filtered off after three days, washed with water until chlorine-free and recrystallized from ethanol, M.P. 85–87° C.

*Analysis.*—Calcd. for C$_{46}$H$_{96}$O$_8$P$_2$ [838]: C, 65.9; H, 11.4; P, 7.4. Found: C, 65.3; H, 11.8; P, 6.5.

Acid number (TAN–E).—Calcd. 134, found 121 [mg. HOK/g. sample].

EXAMPLE V

*1,4-phenylene-bis(n-octadecyl hydrogen phosphate)*

58.4 g. (0.2 mole) of sodium n-octadecylalcoholate in about 350 ml. of benzene were added to a solution of 34.4 g. (0.1 mole) of 1,4-phenylene-bis(phosphorodichloridate) in 300 ml. of hot benzene. The mixture was stirred for six hours. A slight precipitate was formed after standing overnight. It was filtered off, the solvent was removed in vacuo and the residue treated with water. A white precipitate was formed. The water was filtered off and the remaining substance was washed several times with water until chlorine-free. Recrystallization from ethanol gave M.P. 54–60° C.; after two more recrystallizations from ethanol and propanol the melting point was 55–57°.

*Analysis.*—Calcd for C$_{42}$H$_{80}$O$_8$P$_2$ [774]: C, 65,0; H, 10.4; P, 8.0. Found: C, 67.3; H, 10.75; P, 5.7.

Other examples prepared by the methods of Examples I–V are illustrated below.

EXAMPLE VI 1,4-dimethylene cyclohexane-bis(octyl hydrogen phosphate).

EXAMPLE VII

Tetradecane-1,14-bis(hexadecyl hydrogen phosphate).

EXAMPLE VIII

Cyclohexane-bis(octadecyl hydrogen phosphate).

EXAMPLE IX 1,4-phenylene-bis(cyclohexyl hydrogen phosphate).

EXAMPLE X

Bis(3,5 - ditert.butyl-4-hydroxyphenyl)methane bis(dodecyl hydrogen phosphate).

Still another class of novel compounds of the present invention are the polymeric amine complexes of the diacid diphosphate esters of the present invention, the acid portion of which is represented by the general Formula I and specifically illustrated by the Examples I–X. The basic portion of such complexes are derived from nitrogen-containing polymerizable monomers containing primary, secondary or tertiary (the latter two are preferred) amino-nitrogen, including heterocyclic amino-containing substances, having an ethylenically unsaturated polymerizable group. These ploymers may be obtained by polymerizing vinyl-substituted heterocyclic amino nitrogen-containing substances such as vinyl pyridine, or polyamines prepared by reducing, in the presence of ammonia or primary or secondary amines, with polymerizable unsaturated alcohols, acids or esters such as acrylates and methacrylates of long-chain fatty acids, and the like. The preferred polymeric amino compounds are those containing tertiary amine groups and particularly those containing heterocyclic amino groups such as obtained by copolymerizing a polymerizable heterocyclic nitrogen base compound with a polymerizable unsaturated material free of heterocyclic nitrogen-containing radicals which can be illustrated by: copolymers of stearyl methacrylate, lauryl methacrylate and 2-methyl-5-vinyl pyridine; and those which contain additional $C_{1-4}$ alkyl methacrylates in the polymer, such as copolymers of stearyl methacrylate, lauryl methacrylate, methyl methacrylate and 2-methyl-5-vinyl pyridine; and similar copolymers in which the methyl methacrylate is replaced by butyl methacrylate and 2-methyl-5-vinyl pyridine is replaced by 5-ethyl-2-vinyl pyridine. Other suitable polymeric amines are copolymers of $C_{8-18}$ alkyl acrylates, e.g., lauryl methacrylate and aminoalkyl acrylates, e.g., diethylaminoethyl methacrylate. The molecular weight of such polymers varies from 50,000 to over 2 million, preferably between 400,000 and 800,000 as determined by the light scattering method.

Still another class of basic amino nitrogen-containing polymers are polymeric amino-imide-containing compounds derived from the reaction of polyolefin-substituted succinic anhydride and a polyalkylene polyamine so as to form such compounds as N-dialkylamino alkyl alkenyl succinimides and illustrated by N-dimethylaminopropyl polybutenyl succinimide, or tetraethylene pentamine derivative of polybutenyl succinic anhydride and the like in the molecular weight range of 1,500 to 5,000.

Preferred amino compounds for making complexes of the present invention are: (1) copolymer of 30% stearyl methacrylate, 51% lauryl methacrylate, 14% methyl methacrylate and 5% 2-methyl-2-vinyl pyridine (M.W. 600,000, N=0.02%); (2) copolymer of lauryl methacrylate/stearyl methacrylate/2-methyl-5-vinyl pyridine (M.W. 800,000, N 2=0.6%); (3) copolymer of lauryl methacrylate / stearyl methacrylate / 4-vinyl pyridine (M.W.=60,000, N=0.8%); (4) copolymer of lauryl methacrylate/5-ethyl-2-vinyl pyridine (M.W.=100,000, N=3.05); (5) copolymer of stearyl methacrylate/2-vinyl pyridine (M.W.=200,000, N=2.8); (6) copolymer of lauryl methacrylate/vinyl pyrrolidone (M.W.=450,000); (7) imide of diethylene triamine and polybutenyl succinic anhydride; (8) imide of tetraethylene pentamine and mono(polyisobutylene)succinic anhydride; (9) imide of β-aminoethyl piperazine and mono(polyisobutylene)succinic anhydride; (10) imide of tetraethylene pentamine and mono(polypropylene)succinic anhydride and mixtures thereof. The polyolefin radical in compounds (7) to (10) have a molecular weight range of from 500 to 1,500.

The complexes are formed by mixing the diacid diphosphate with the basic nitrogen-containing polymers per se, or dissolving them in a suitable liquid carrier such as a liquid hydrocarbon, e.g., mineral oil and if necessary, heating the mixture between 50 and 500° F. The mole ratio of the reactants can vary from 1:10 to 10:1 and preferably from 1:4 to 4:1 respectively.

An example illustrating the complex of the present invention is given below.

*Example A.*—About 1 mole of the additive of Example I in mineral lubricating oil was admixed with about 4 moles of the imide of Example 8 and the mixture heated at between 150–200° F. The complex thus formed can be used as an additive concentrate. Other complexes are:

*Example B.*—Complex of Example I (1M) and Example 8 (2M).

*Example C.*—Complex of Example II (1M) and Example 9 (2M).

*Example D.*—Complex of Example V (1M) and Example 10 (4M).

*Example E.*—Complex of Example I (1M) and Example 1 (2M).

*Example F.*—Complex of Example II (1M) and Example 8 (4M).

*Example G.*—Complex of Example IV (1M) and Example 8 (4M).

*Example H.*—Complex of Example V (1M) and Example 8 (4M).

The additives of the present invention can be used in concentrations of from about 0.01% to about 15%, preferably between 0.1% and 5% by weight in various functional fluids such as mineral oils, fuels, greases, industrial fluids, e.g., transmission fluids and the like.

When desired, additional improvements can be imparted to such components, e.g., mineral lubricating oil compositions containing the additives of the present invention by incorporating small amounts (0.01%–2%, preferably 0.1–1%) of phenolic antioxidants such as alkylphenols, e.g., 2,6-ditert.butyl-4-methylphenol or p,p'-methylene bisphenols such as 1,1-bis(3,5-ditert.butyl-4-hydroxyphenyl) methane or arylamines such as phenyl-alpha-naphthylamine, bis(aminophenyl)methane, sulfurized fatty oils and derivatives thereof, e.g., sulfurized sperm oil, sulfurized oleic acid and the like. Also, the nitrogen-containing polymers used to form the complexes and illustrated by Examples 1–10 can be present in excess of from 1 to 10% of that required to neutralize the diacid diphosphate.

Lubricating oils for additives of this invention can be any natural or synthetic material having lubricating properties. Thus, the base may be a hydrocarbon oil of wide viscosity range, e.g., 100 SUS at 100° F. to 150 SUS at 210° F. The hydrocarbon oils may be blended synthetic lubricants such as polymerized olefins, organic esters of organic and inorganic acids, e.g., di-2-ethylhexyl sebacate, pentaerythritol esters of mixed $C_{3-8}$ fatty acids; polyalkyl silicone polymers, e.g., dimethyl silicone polymer, and the like. If desired, the synthetic lubricants may be used as the sole base lubricant.

Mineral lubricating oils which are particularly desirable for use in compositions of this invention and which have been used as a base for the compositions of this invention were obtained from West Texas Ellenburger crudes, East Texas crudes, Oklahoma crudes and California crudes. A useful refined oil therefrom had the following properties:

| | |
|---|---|
| Gravity, ° API, minimum | 26.5 |
| Pour point, 0°F., maximum | 10 |
| Flash, COC, ° F., minimum | 390 |
| Viscosity, SUS at 100° F. | 120–160 |
| Viscosity index, minimum | 95 |

Another such oil is a SAE 30 mineral oil having the following properties:

| | |
|---|---|
| Gravity, ° API, minimum | 24.5 |
| Pour point, ° F., maximum | −5 |
| Flash, COC, ° F., minimum | 415 |
| Viscosity, SUS at 210° F. | 58–63 |
| Viscosity index | 50–60 |

Preferred compositions of this invention are illustrated by the following examples:

| Composition A: | Percent |
|---|---|
| Example I | 2. |
| Mineral lubricating oil | Balance. |
| Composition B: | |
| Example II | 4. |
| Mineral lubricating oil | Balance. |
| Composition C: | |
| Example III | 3. |
| Mineral lubricating oil | Balance. |

| | Percent |
|---|---|
| Composition D: | |
| Example IV | 2. |
| Mineral lubricating oil | Balance. |
| Composition E: | |
| Example V | 2. |
| Mineral lubricating oil | Balance. |
| Composition F: | |
| Complex of Example A | 2. |
| Mineral lubricating oil | Balance. |
| Composition G: | |
| Complex of Example F | 2. |
| Mineral lubricating oil | Balance. |
| Composition H: | |
| Complex of Example G | 2. |
| Mineral lubricating oil | Balance. |
| Composition I: | |
| Complex of Example A | 2. |
| Copolymer (1) namely copolymer of 30% stearyl methacrylate, 51% lauryl methacrylate, 14% methyl methacrylate and 5% 2-methyl-5-vinyl pyridine | 5. |
| Bis(3,5 - ditert.butyl - 4 - hydroxyphenyl) methane | 0.5. |
| Mineral lubricating oil | Balance. |
| Composition J: | |
| Complex of Example F | 2. |
| Copolymer (1) namely copolymer of 30% stearyl methacrylate, 51% lauryl methacrylate, 14% methyl methacrylate and 5% 2-methyl-5-vinyl pyridine | 5. |
| Bis(3,5 - ditert.butyl - 4 - hydroxyphenyl) methane | 0.5. |
| Mineral lubricating oil | Balance. |
| Composition K: | |
| Complex of Example F | 2. |
| Copolymer (1) namely copolymer of 30% stearyl methacrylate, 51% lauryl methacrylate, 14% methyl methacrylate and 5% 2-methyl-5-vinyl pyridine | 5. |
| Bis(3,5 - ditert.butyl - 4 - hydroxyphenyl) methane | 0.5. |
| Mineral lubricating oil | Balance. |
| Composition L: | |
| Complex of Example H | 2. |
| Copolymer (1) namely copolymer of 30% stearyl methacrylate, 51% lauryl methacrylate, 14% methyl methacrylate and 5% 2-methyl-5-vinyl pyridine | 5. |
| Bis(3,5 - ditert.butyl - 4 - hydroxyphenyl) methane | 0.5. |
| Mineral lubricating oil | Balance. |

Compositions A–L were tested in (1) the Oldsmobile Scuffing Test under the following conditions: 1960 Oldsmobile engine fitted with 260-lb. valve springs and the test run consists of 30 cycles with each cycle consisting of 10 minutes running time at 2500 r.p.m. under no load and 20 minutes down time. Jacket and oil-sump temperatures were between 65 and 135° F. for the jacket and 130–175° F. for the oil-sump temperatures at the beginning and the end of the running cycle, and (2) Copper-Lead Corrosion Test (CLC) which consists of the addition of cleaned and weighed copper and lead coils to a sample of oil, which is then placed in the Micro Air Oxidation Test (MAOT) apparatus at 325° F. The MAOT is ordinarily used to measure the oxidation stability of oils. A vessel containing 20 g. of sample is placed in a constant temperature bath. The vessel is fitted with a condenser and a fritted bubbler tube. Clean dry air is bubbled through the oil at a constant flow rate of 30 ml./min. After passage through the oil sample, the air stream is directed through a Beckman oxygen analyzer. This device senses the amount of oxygen present in the air stream, thereby providing a measure of the oxygen absorbed by the oil sample. The use of the MAOT apparatus makes it possible to examine simultaneously the oxidation stability and corrosivity of the oil. After five hours, the wire coils are removed, washed with benzene and methanol, wiped free of deposits and weighed. The data appear to be reproducible within ±2 mg. In cases of excessive oxygen uptake (>2%) the reproducibility is ±10% of the total weight change.

Compositions A–L passed the two tests with essentially no scuffing or wear of cam and lifter parts in test (1) and no rust or corrosion of copper-lead bearings or parts in test (2). When the diacid diphosphate was removed from the compositions tested or the diacid diphosphate was replaced with corresponding full ester or other phosphate esters such as triphenyl phosphate these compositions and neat mineral lubricating oil cause severe scuffing and wear in the Oldsmobile test and failed in the CLC test due to severe corrosion of copper-lead bearings.

Compositions of this invention can be used as engine lubricants, hydraulic fluids, industrial lubricants and fuels, greases and the like.

We claim as our invention:

1. A lubricating oil composition comprising a major amount of lubricating oil and a minor amount of from 0.1% to 15% by weight of a diacid diphosphate ester having the formula

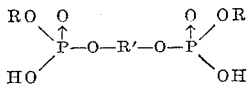

where R is a hydrocarbyl radical having from 1–30 carbon atoms selected from the group consisting of alkyl, alkaryl, aralkyl and cycloalkyl radicals and R' is a hydrocarbyl radical having from 6 to 22 carbon atoms.

2. A lubricating oil composition comprising a major amount of lubricating oil and from 0.1% to 15% of a complex of a diacid phosphate ester of claim 1 and a polymeric amino-compound having a plurality of basic amino-nitrogen groups in the molecule.

3. A mineral lubricating oil composition comprising of a major amount of mineral lubricating oil and from 0.01% to 15% of 1,4-phenylene-bis(n-dodecyl hydrogen phosphate).

4. A mineral lubricating oil composition comprising of a major amount of mineral lubricating oil and from 0.01% to 15% of decane-1,10-bis(n-dodecyl hydrogen phosphate).

5. A mineral lubricating oil composition comprising a major amount of mineral lubricating oil and from 0.01% to 15% of a complex of 1,4-phenylene-bis(n-dodecyl hydrogen phosphate) and an amino-imide of mono(polyisobutylene)succinic anhydride and tetraethylene pentamine.

6. A mineral lubricating oil composition comprising a major amount of mineral lubricating oil and from 0.01% to 15% of a complex of 1,4-dimethylene cyclohexane-bis(n-octadecyl hydrogen phosphate) and an amino-imide of mono(polyisobutylene)succinic anhydride and tetraethylene pentamine.

References Cited by the Examiner
UNITED STATES PATENTS

| | | | |
|---|---|---|---|
| 2,686,760 | 8/1954 | Watson | 252—49.8 X |
| 3,071,548 | 1/1963 | Gleim et al. | 252—49.8 X |
| 3,169,925 | 2/1965 | Mahoney | 252—49.8 X |

DANIEL E. WYMAN, *Primary Examiner.*

W. H. CANNON, *Assistant Examiner.*